(12) United States Patent
Shibuya et al.

(10) Patent No.: US 8,080,683 B2
(45) Date of Patent: Dec. 20, 2011

(54) ELECTROCHROMIC COMPOUND AND ELECTROCHROMIC DISPLAY DEVICE USING THE SAME

(75) Inventors: Takeshi Shibuya, Tsukuba (JP); Shigenobu Hirano, Yokohama (JP); Hiroshi Kondo, Yokohama (JP); Yuki Nakamura, Machida (JP); Yukiko Abe, Yokohama (JP); Tohru Yashiro, Yokosuka (JP)

(73) Assignee: Ricoh Company, Ltd., Tokyo (JP)

( * ) Notice: Subject to any disclaimer, the term of this patent is extended or adjusted under 35 U.S.C. 154(b) by 392 days.

(21) Appl. No.: 12/401,225

(22) Filed: Mar. 10, 2009

(65) Prior Publication Data

US 2009/0231664 A1    Sep. 17, 2009

(30) Foreign Application Priority Data

Mar. 11, 2008 (JP) .................... 2008-061660

(51) Int. Cl.
 *C07C 69/00* (2006.01)
(52) U.S. Cl. ............. 560/66; 560/8; 560/18; 570/124; 359/265; 359/273
(58) Field of Classification Search .............. None
See application file for complete search history.

(56) References Cited

U.S. PATENT DOCUMENTS

| | | | |
|---|---|---|---|
| 6,301,038 B1 | 10/2001 | Fitzmaurice et al. | |
| 6,344,918 B1 * | 2/2002 | Berneth et al. | 359/265 |
| 6,870,657 B1 * | 3/2005 | Fitzmaurice et al. | 359/273 |
| 7,333,259 B2 | 2/2008 | Hirano et al. | |
| 7,489,432 B2 | 2/2009 | Shibuya et al. | |
| 2006/0204866 A1 | 9/2006 | Hirano et al. | |
| 2008/0013152 A1 | 1/2008 | Hirano et al. | |
| 2008/0112033 A1 | 5/2008 | Shibuya et al. | |
| 2009/0002802 A1 | 1/2009 | Shibuya et al. | |

FOREIGN PATENT DOCUMENTS

| | | |
|---|---|---|
| JP | 62-71934 | 4/1987 |
| JP | 62-104891 | 5/1987 |
| JP | 62104891 A * | 5/1987 |
| JP | 2001-510590 | 7/2001 |
| JP | 2002-328401 | 11/2002 |
| JP | 2003-161964 | 6/2003 |
| JP | 2004-151265 | 5/2004 |
| JP | 2004-520621 | 7/2004 |
| JP | 2004-361514 | 12/2004 |
| JP | 2004-536344 | 12/2004 |
| JP | 2006-71767 | 3/2006 |
| JP | 2006-106669 | 4/2006 |
| JP | 3955641 | 5/2007 |
| WO | WO 02/086612 A1 | 10/2002 |
| WO | WO 03/009059 A1 | 1/2003 |

OTHER PUBLICATIONS

U.S. Appl. No. 12/401,156, filed Mar. 10, 2009, Hirano, et al.

* cited by examiner

*Primary Examiner* — Sudhakar Katakam
(74) *Attorney, Agent, or Firm* — Oblon, Spivak, McClelland, Maier & Neustadt, L.L.P.

(57) ABSTRACT

An electrochromic compound represented by the following General Formula (1).

A-$(CX_2)_n$—B    General Formula (1)

In the formula, A is a monovalent binding group, B is a redox chromophore, X is a halogen atom, and n is an integer of 1 or more.

5 Claims, 1 Drawing Sheet

ELECTROCHROMIC COMPOUND AND ELECTROCHROMIC DISPLAY DEVICE USING THE SAME

BACKGROUND OF THE INVENTION

1. Field of the Invention

The present invention relates to a display device, specifically to a structure of display device using a color forming material capable of repeatedly changing its color by a redox reaction; a reflective display; and an electronic paper.

2. Description of the Related Art

Recently, much research effort has been made to electronic paper as an electronic medium that is expected to displace paper. In contrast to conventional displays including CRTs and liquid crystal displays (LCDs), electronic paper requires the following characteristics: being a reflective display device; high white reflectivity and contrast ratio; high definition display; memory effect; low-voltage drive capability; slimness; lightness; and inexpensiveness, etc. In terms of its display characteristics, in particular, it is required that electronic paper has as excellent white reflectivity and contrast ratio as paper does, and the development of a display device offering all of these characteristics is far from easy. In addition, since a conventional display, paper medium, is generally a full-color display, colorization of electronic paper has strongly been demanded.

Techniques for electronic paper capable of displaying colors which have been so far proposed include a medium in which a color filter is formed on a reflective liquid crystal device, which has already been commercialized. The media, however, have the following problems: low light-utilizing efficiency due to the use of a polarizing plate; being incapable of displaying colors other than dark white; and low contrast ratio because of incapability of displaying black color.

As a bright reflective display device, there has been an electrophoretic device whose principle is to migrate charged white particles and charged black particles in an electric field. In such a device, however, it is practically difficult to completely reverse the white particles and the black particles so that it is hard to simultaneously satisfy high white reflectivity and high contrast ratio. Japanese Patent Application Laid-Open (JP-A) Nos. 2003-161964 and 2004-361514 disclose a reflective color display medium in which a color filter is formed on a electrophoretic device. However, it is clear that an excellent image quality cannot be obtained by forming a color filter on a display medium having low white reflectivity and low contrast ratio. JP-A Nos. 2004-520621 and 2004-536344 disclose an electrophoretic device which performs colorization by migrating particles having a plurality of colors. These devices cannot solve the above-mentioned problems in principle, and cannot simultaneously fulfill high white reflectivity and high contrast ratio.

A phenomenon in which electrochromic materials applied with a voltage show a reversible color change during the electrochemical redox reaction is called electrochromism. Electrochromic display device, which utilizes color change in electrochromic compounds that cause such a phenomenon, has emerged as a candidate for electrochromic paper because it serves as a reflective display device, has high white reflectivity as well as a memory effect, and can be driven at a low voltage. For example, JP-A Nos. 2001-510590, 2002-328401 and 2004-151265 disclose electrochromic devices in which an organic electrochromic compound is attached to the surface of semiconductor fine particles made of, for example, titanium oxide. Such electrochromic devices have effective structures because they can lower the amount of electric charge necessary for the drive, and they can accelerate coloration/decoloration reaction. However, the organic electrochromic compounds illustrated in the two publications form colors such as blue and green, but cannot form three primary colors, i.e., yellow, magenta and cyan, which are necessary for producing a full color display.

JP-A Nos. 62-71934 and 2006-71767 disclose aromatic dicarboxylic acid ester derivatives which are organic electrochromic compounds forming the three primary colors, i.e., yellow, magenta and cyan. Although these organic electrochromic compounds can form the three primary colors, they have no memory effect, so that when voltage-applying is stopped, these compounds lose their colors in about one second. Thus, these compounds cannot be used for electronic paper which needs memory effect.

BRIEF SUMMARY OF THE INVENTION

The problem to be solved by the present invention is to provide an electrochromic device which can retain coloration and/or decoloration for a longer period of time.

The above problem can be solved by the following aspects of the present invention.

<1> An electrochromic compound represented by the following General Formula (1):

$$A\text{-}(CX_2)_n\text{---}B \qquad \text{General Formula (1)}$$

wherein A is a monovalent binding group, B is a redox chromophore, X is a halogen atom, and n is an integer of 1 or more.

<2> The electrochromic compound according to <1>, wherein the redox chromophore B contains any one of structures represented by the following General Formulas (2a) to (4b):

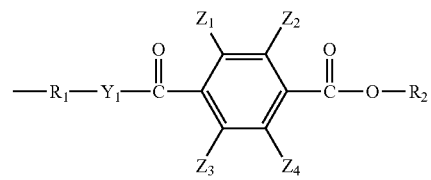

General Formula (2a)

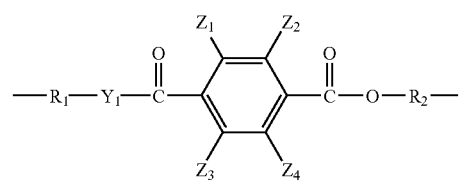

General Formula (2b)

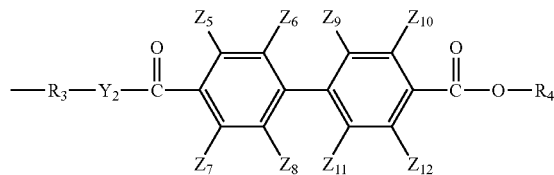

General Formula (3a)

General Formula (3b)

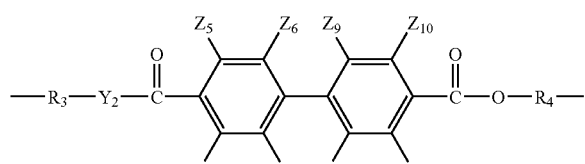

General Formula (4a)

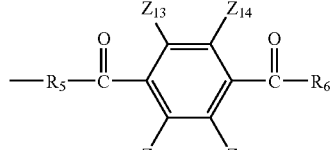

General Formula (4b)

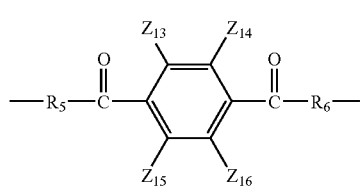

In the above General Formulas (2a) to (4b), $Z_1$ to $Z_{16}$ are the same or different and each represent a hydrogen atom or a monovalent substituent, $R_1$, $R_3$ and $R_5$ are the same or different, and each represent a divalent organic group, $R_2$, $R_4$ and $R_6$ are the same or different, and each represent a monovalent organic group which is represented by General Formula (2a), (3a) or (4a) or divalent organic group which is represented by General Formula (2b), (3b) or (4b), General Formulas (2a), (3a) and (4a) correspond to a case where the redox chromophore B is a terminal group, and General Formulas (2b), (3b) and (4b) correspond to a case where the redox chromophore B is a divalent intermediate group which is interposed between the group —(CX$_2$)— and the terminal group, and $Y_1$ and $Y_2$ each represent an oxygen atom or a nitride.

<3> The electrochromic compound according to any one of <1> and <2>, wherein the binding group A is a phosphonic acid group, phosphoric acid group, or an organic group containing a phosphonic acid group or a phosphoric group.

<4> The electrochromic compound according to any one of <1> and <2>, wherein the binding group A is a silyl group or an organic group containing a silyl group.

<5> The electrochromic compound according to any one of <1> to <4>, wherein the X is a fluorine atom.

<6> An electrochromic composition including:
a conductive or semi-conductive nano structural unit, and
an electrochromic compound according to any one of <1> to <5>, which is attached to the conductive or semi-conductive nano structural unit <7> A display device including:
a display electrode,
a counter electrode which is placed opposite to the display electrode with a space, and
an electrolyte placed in the space between the display electrode and the counter electrode,
wherein the display electrode has a display layer on a surface thereof facing the counter electrode,
wherein the display layer includes an electrochromic compound according to any one of <1> to <5> or an electrochromic composition according to <6>.

As the specific and detailed description below will clarify, the present invention achieves extremely excellent effect in providing an electrochromic display device capable of retaining coloring and/or decoloring for a longer period of time by interposing a halogenized carbohydrate group —(CX$_2$)— between the monovalent binding group A, which binds to the electrode to become a site through which electrons are poured into or from the electrode, and the redox chromophore B, which causes, by giving or receiving electrons, a redox reaction producing coloration or decoloration, thereby blocking the stream of electrons from the redox chromophore B to the electrode, suppressing the discharge rate of electrons.

DETAILED DESCRIPTION OF THE INVENTION

Figure 1A:
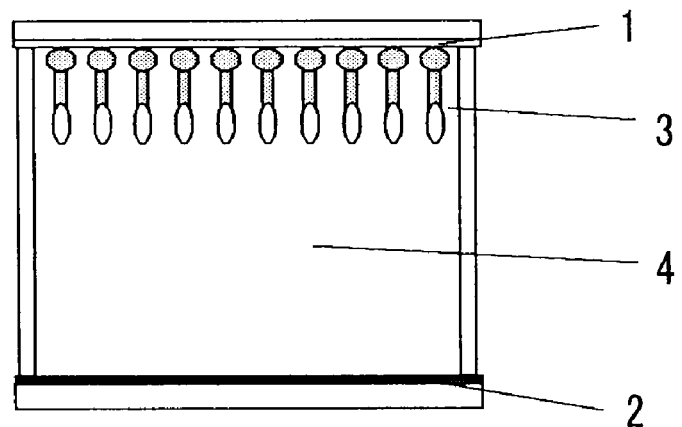
FIG. 1A shows an example of an illustrative structure of a display device using the electrochromic compound of the present invention.

The present inventors have extensively studied means for solving the above-mentioned problems, and found that the electrochromic compound represented by the General Formula (1) can solve the problems.

Specifically, the electrochromic compound having the structural formula represented by the following General Formula (1) is excellent in image retainability.

General Formula (1)

In the General Formula (1), A is a monovalent binding group, B is a redox chromophore, X is a halogen atom, and n is an integer of 1 or more.

In the General Formula (1), the structure of the redox chromophore B is not particularly limited and may be a coloring structure of a known electrochromic compound. Examples thereof include structures derived from a low molecular electrochromic compound such as viologen, phenothiazine, anthraquinone, styryl spiropyran, pyrazoline, fluorane, styryl spiropyran pigments, phthalocyanine, phthalic acid. The electrochromic compound of the present invention is excellent in coloring performance if the redox chromophore B contains any one of the structures represented by the General Formulas (2a) to (4b).

General Formula (2a)

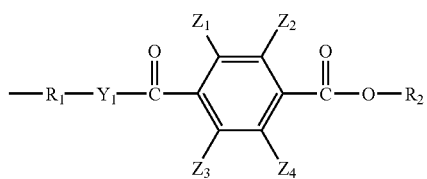

General Formula (2b)

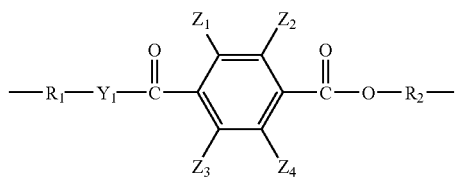

General Formula (3a)

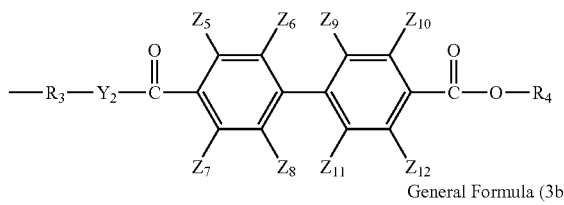

General Formula (3b)

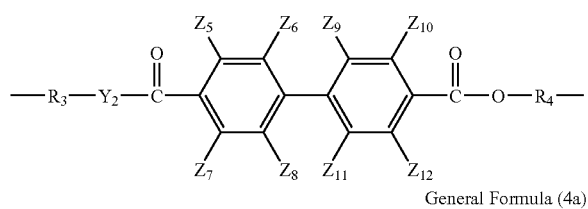

General Formula (4a)

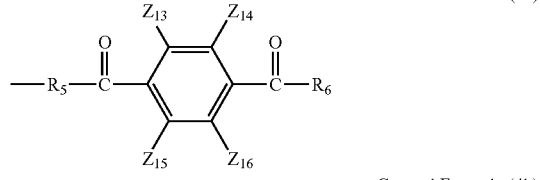

General Formula (4b)

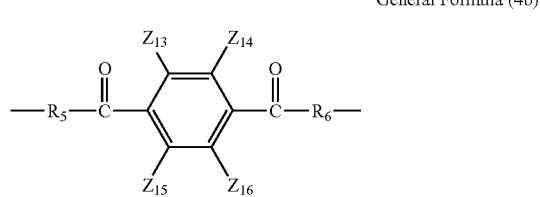

In the above General Formulas (2a) to (4b), $Z_1$ to $Z_{16}$ are the same or different and each represent a hydrogen atom or a monovalent substituent, $R_1$, $R_3$ and $R_5$ may be the same or different, and each represent a divalent organic group, $R_2$, $R_4$ and $R_6$ may be the same or different, and each represent a monovalent organic group (General Formulas (2a), (3a) and (4a)) or divalent organic group (General Formulas (2b), (3b) and (4b)), General Formulas (2a), (3a) and (4a) correspond to the case where the redox chromophore B is a terminal group, and General Formulas (2b), (3b) and (4b) correspond to the case where the redox chromophore B is a divalent intermediate group which is interposed between the group —($CX_2$)— and the terminal group, and $Y_1$ and $Y_2$ each represent an oxygen atom or a nitride.

Specifically, it is preferable to use any one of the structures in which each of $Z_1$ to $Z_{16}$ is hydrogen atoms because they can be easily synthesized. The groups $R_1$ to $R_6$ are preferably an alkyl group or a halogenized alkyl group in terms of stability, which may have a branched structure, ether structure or ester structure.

$Y_1$ is preferably an oxygen atom or a secondary amino group in terms of easy synthesis and stability.

In the General Formula (1), the binding group A is not limited provided that it can adsorb and bind to the electrode or the conductive or semi-conductive material formed on the electrode. Specific examples include carboxylic acid group, phosphonic acid group, sulphonic acid group, phosphoric acid group, hydroxyl group, silyl group, trialkoxysilyl group, and trialkylsilyl group. Of these, phosphoric group and phosphonic group are preferable because they are easy to synthesize and have high adsorbability so that a device is easy to produce and is highly durable. Silyl group is also preferable because it has strong binding ability so that higher durability can be expected. Here, the silyl group refers to a group containing at least a moiety of —SiO—.

In the General Formula (1), a halogen atom X is not particularly limited, and may be the same or different species in the compound, but it is preferable to use the same species of halogen atom in terms of easiness in production. Preferable halogen atoms are flurorine atom, chlorine atom and bromine atom in terms of stability. Of these, fluorine atom is more preferable in terms of stability.

The followings are specific examples of the electrochromic compound of the present invention, which do not limit the scope of the electrochromic compound of the present invention.

Compound No. 1

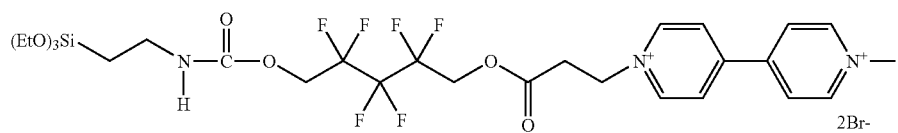

Compound No. 2

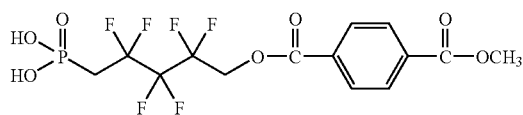

Compound No. 3

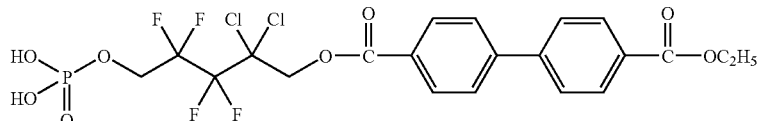

Compound No. 4

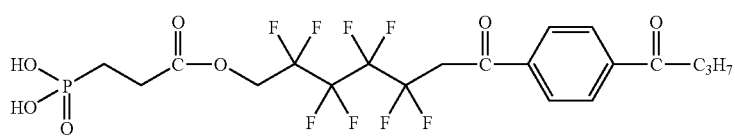

-continued

Compound No. 5
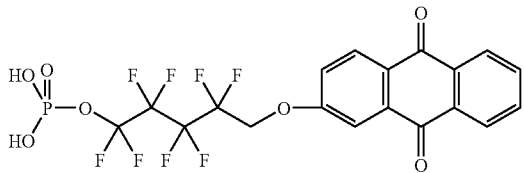

Compound No. 6
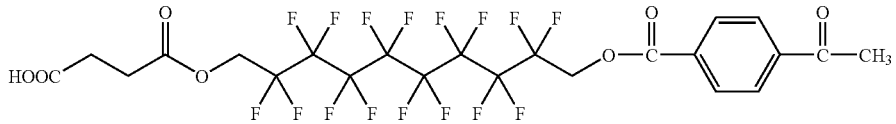

Compound No. 7
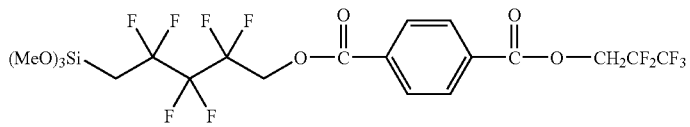

Compound No. 8
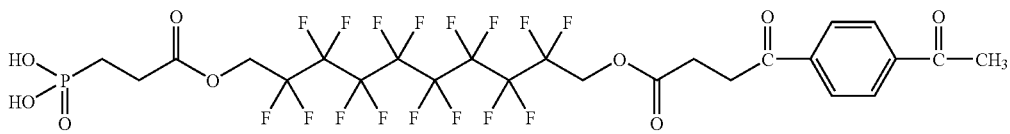

Compound No. 9
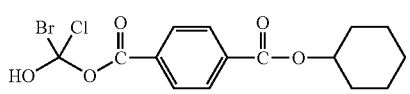

Compound No. 10
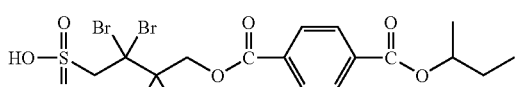

Compound No. 11
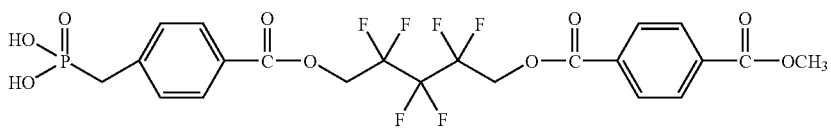

Compound No. 12
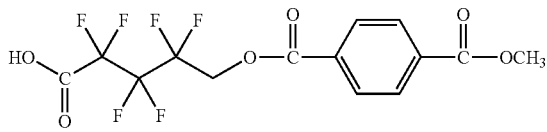

The electrochromic compound of the present invention can be synthesized in the same or similar process to the process described in JP-A No. 2006-71767.

The electrochromic composition in which the electrochromic compound of the present invention is bound to the conductive or semi-conductive nano structural unit is excellent in retentivity of a colored image.

The conductive or semi-conductive nano structural unit is preferably any of metal oxides, more preferably metal oxide fine particles having an average primary particle diameter of 30 nm or less. With the use of such metal oxide fine particles, light transmission through a metal oxide is greatly enhanced. Examples of the metal oxides include aluminum oxide, titanium oxide, zinc oxide, tin oxide, manganese oxide, magnesium oxide, zirconium oxide, strontium titanate, molybdenum oxide, cobalt oxide, bismuth oxide, chromium oxide, antimony oxide, nickel oxide, copper oxide, iron oxide, tungsten oxide, and silicon oxide as a single compound or as a complex thereof (alloy). Of these, titanium oxide, zinc oxide, and tin oxide is preferable, with titanium oxide being more preferable.

Figure 1B:
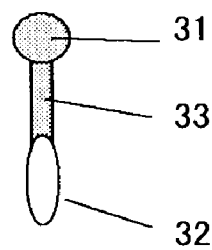
FIG. 1B shows an enlarged view of the electrochromic compound 3 in FIG. 1A.

FIG. 1A shows an example of the general configuration of the display device using the electrochromic compound of the present invention. In FIG. 1A, a reference numeral 1 denotes a display electrode; 2, a counter electrode; 3, an electrochromic compound; and 4, an electrolyte placed between the two electrodes. FIG. 1B is an enlarged view of the electrochromic compound 3 shown in FIG. 1A. In FIG. 1B, a reference numeral 31 denotes an adsorbable group; 32, a redox chromophore; and 33, a spacer portion.

Figure 2:
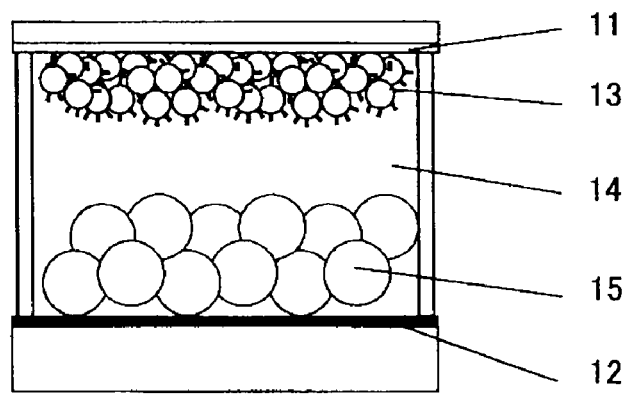
FIG. 2 shows an example of an illustrative structure of a display device using the electrochromic composition of the present invention.

FIG. 2 shows an example of the general configuration of the display device using the electrochromic composition of the present invention. In FIG. 2, reference numeral 11 denotes a display electrode; 12, a counter electrode; 13, an electrochromic composition; 14, an electrolyte placed between the two electrodes; and 15, a white color-reflective layer.

The layer of the electrochromic compound 3 or the electrochromic composition 13 is disposed onto one surface of the display electrode 1, 11, the surface facing the counter electrode 2, 12. Examples of the method of forming the layer include an immersion method, a dipping method, a vapor deposition method, a spin coat method, a printing method, and inkjet method. Since the electrochromic compound of the present invention has a binding group, the compound can adsorb or attach to the conductive or semi-conductive nano structural unit through the intermediary of the binding group.

As for the display electrode, it is preferable to use a transparent conductive substrate. The transparent conductive substrate is preferably a glass or plastic film on which a transparent conductive film made of ITO, FTO, ZnO or the like is formed by coating. Plastic film substrate is preferable because it can provide a light, flexible display device.

The counter electrode is coated with a transparent conductive film made of ITO, tin oxide, zinc oxide, or the like, or coated with a conductive metal film made of zinc, platinum, or the like. The counter electrode is also formed on a substrate. The substrate for the counter electrode is preferably a glass plate or a plastic film.

Examples of the electrolyte include a solution in which a lithium salt such as lithium perchlorate or lithium fluoroborate is dissolved in an organic solvent such as acetonitrile or propylene carbonate; and a solid such as perfluorosulfonic acid-based polymer film. The solution electrolyte has an advantage of high ionic conductance. The solid electrolyte causes no degradation and so is suitable for producing highly durable device.

When the display device of the present invention is used as a reflective display device, it is preferable to place a white reflective layer between the display electrode and the counter electrode. The easiest way to form the white reflective layer is to disperse white pigment particles in a resin and then apply the dispersion product to the counter electrode. Examples of the white pigment particles include a fine particle made of commonly used metal oxides such as titanium oxide, aluminum oxide, zinc oxide, silicon oxide, cesium oxide, and yttrium oxide.

The method of driving the display device may be selected from any of known methods capable of applying a voltage and an electric current. Passive driving method enables to produce an inexpensive display device. Active driving method enables to produce a high definition, high speed display device. The active driving can be performed by forming an active driving element on the substrate of the counter electrode.

EXAMPLES

Hereinafter, the electrochromic compound, electrochromic composition, and the electrochromic device using them are explained in more detail.

Example 1

1) Display Electrode 0.2 M of Compound No. 11 was dissolved in a mixed solvent of methanol and isopropanol. In the resultant solution, a glass substrate whose whole surface was covered with tin oxide transparent electrode film was immersed for 24 hours to allow Compound No. 11 to adsorb on the surface of the electrode, whereby a display electrode was produced.

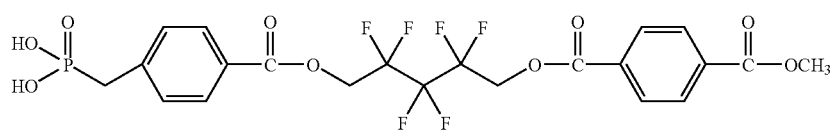

Compound No. 11

2) Counter Electrode 10 g of titanium oxide (a white pigment) was mixed with 10% methylethylketone solution (10 g) of acryl resin, and the mixture was dispersed for 1 hour with 2 mm zirconia beads (50 g) using a ball mill. The resultant dispersion liquid was applied on a zinc substrate, whereby a counter electrode having a white reflective layer thereon was obtained.

3) Electrochromic Device

A spacer having a thickness of 100 μm was placed between the transparent display electrode obtained in 1) and the counter electrode obtained in 2) such that the two electrodes face each other across the spacer. Into the vacant space, a DMSO solution (concentration: 0.2 M) of tetrabutyl ammonium chloride was poured, whereby an electrochromic device was obtained.

The display electrode and the counter electrode of the display device were respectively connected to an anode and cathode, and a voltage of 2.5 V was applied for 1 second, whereby the display device developed magenta. For about 50 seconds after applying the voltage, the display device continued to produce a color.

Example 2

An electrochromic display device was prepared in the same way as in Example 1, except that a display electrode was prepared in the following manner.

1) Display Electrode

On a transparent electrode formed by coating tin oxide on a glass substrate, a 20% by mass dispersion liquid of titanium oxide having an average particle diameter of 6 nm was applied with a spin coat method, followed by sintering at 400° C. for 1 hour. The sintered substrate was then immersed for 24 hours into a 0.02 M solution of Compound No. 12 in a mixed solvent of methanol and isopropanol to obtain a substrate having an electrochromic composition in which Compound No. 12 was adsorbed on titanium oxide. Then the substrate was washed and dried to thereby yield a display electrode.

In a display device having the display electrode and a counter electrode, the display electrode and the counter electrode were respectively connected to anode and cathode and applied a voltage of 2.5 V for 1 second, whereby the display device developed magenta. The color continued to exist for about 70 seconds after applying the voltage.

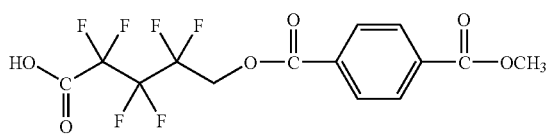

Compound No. 12

Example 3

An electrochromic display device was prepared in the same way as in Example 2, except that Compound No. 12 was changed to Compound No. 11.

In a display device having the display electrode and a counter electrode, the display electrode and the counter electrode were respectively connected to anode and cathode and applied a voltage of 2.5 V for 1 second, whereby the display device developed magenta. The color continued to exist for about 100 seconds after applying the voltage.

Comparative Example 1

An electrochromic display device was prepared in the same way as in Example 1, except that Compound No. 11 was changed to Compound No. 13.

In a display device having the display electrode and a counter electrode, the display electrode and the counter electrode were respectively connected to anode and cathode and applied a voltage of 2.5 V for 1 second, whereby the display device developed magenta. But the color disappeared in 5 seconds after applying the voltage.

Compound No. 13

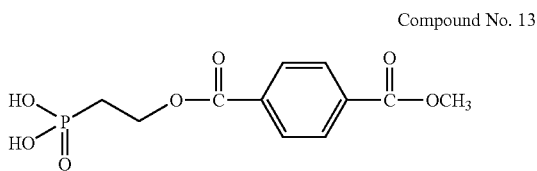

What is claimed is:

1. An electrochromic compound represented by the following General Formula (1):

A-(CX$_2$)$_n$—B      General Formula (1)

wherein A is a monovalent binding group, B is a redox chromophore, X is a halogen atom, and n is an integer of 1 or more, wherein the redox chromophore B comprises any one of structures represented by the following General Formulas (2a) to (4b):

General Formula (2a)

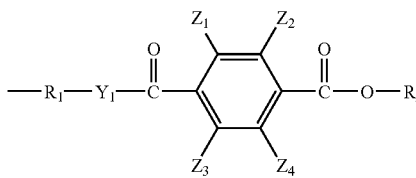

General Formula (2b)

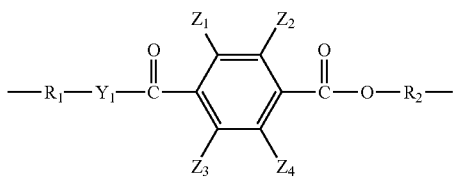

General Formula (3a)

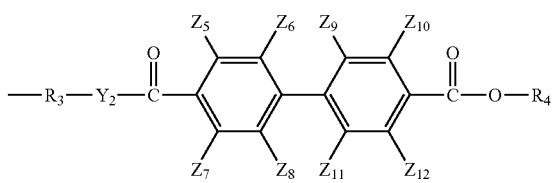

General Formula (3b)

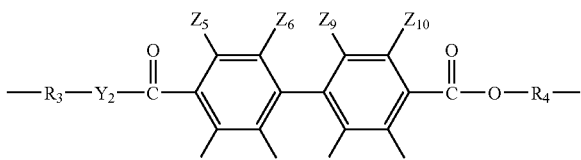

General Formula (4a)

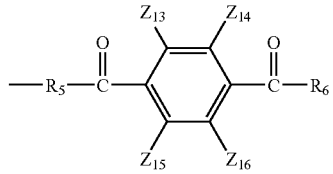

General Formula (4b)

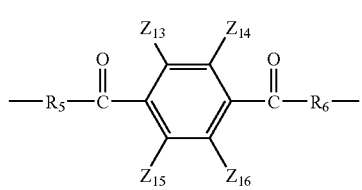

wherein $Z_1$ to $Z_{16}$ are the same or different and each represent a hydrogen atom or a monovalent substituent, $R_1$, $R_3$ and $R_5$ are the same or different, and each represent a divalent organic group, $R_2$, $R_4$ and $R_6$ are the same or different, and each represent a monovalent organic group which is represented by General Formula (2a), (3a) or (4a) or divalent organic group which is represented by General Formula (2b), (3b) or (4b), General Formulas (2a), (3a) and (4a) correspond to a case where the redox chromophore B is a terminal group, and General Formulas (2b), (3b) and (4b) correspond to a case where the redox chromophore B is a divalent intermediate group which is interposed between the group —(CX$_2$)— and the terminal group, and $Y_1$ and $Y_2$ each represent an oxygen atom or a nitride.

2. The electrochromic compound according to claim 1, wherein the binding group A is a phosphonic acid group, phosphoric acid group, or an organic group containing a phosphonic acid group or a phosphoric group.

3. The electrochromic compound according to claim 1, wherein the binding group A is a silyl group or an organic group containing a silyl group.

4. The electrochromic compound according to claim 1, wherein the X is a fluorine atom.

5. An electrochromic composition comprising:
a conductive or semi-conductive nano structural unit, and
an electrochromic compound according to claim 1, wherein the electrochromic compound is attached to the conductive or semi-conductive nano structural unit.

* * * * *